Patented Mar. 18, 1924.

1,487,677

UNITED STATES PATENT OFFICE.

HUGH H. THEIS, OF TAYLOR, TEXAS.

VALVE-SURFACING COMPOSITION.

No Drawing.   Application filed June 16, 1922.  Serial No. 568,852.

*To all whom it may concern:*

Be it known that I, HUGH H. THEIS, a citizen of the United States, residing at Taylor, in the county of Williamson and State of Texas, have invented new and useful Improvements in Valve-Surfacing Compositions, of which the following is a specification.

This invention relates to a valve surfacing composition, designed for application to the surfaces of the valves and valve seats of the inner tubes of pneumatic tires where the surfaces are pitted or worn and improperly contact and cause leakage, the object of the invention being to provide a composition which may be applied to the surfaces to coat the same and fill the pits or indentations, so that the valve may close tightly against its seat to prevent leakage of air from the tire tube.

In carrying the invention into practice, I provide a composition consisting of the following ingredients, combined substantially in the proportions given, to wit:

|  | Ozs. |
|---|---|
| Rubber cement | 5 |
| Cup grease | 6 |
| 600W grease | 4 |
| Graphite | ½ |
| Denatured alcohol | ¼ |
| Muriatic acid | ¼ |
| Distilled water | ½ |

In preparing the composition for use, the first four-named ingredients are put into a suitable receptacle and thoroughly combined by agitation or otherwise, after which the last three ingredients are added and all the ingredients thoroughly mixed together by agitation or otherwise until a thick heavy sticky or glutinous substance is formed.

This substance is applied to the valve surface or valve seat surface which is to be treated by placing a small amount on such surface and blowing it into the pits and over the surface by means of a hand pump or other kind of air appliance, such treatment being continued until all the pits or irregularities are filled and the surface coated. It may, however, by proper means be blown or sprayed from a container over the surface so as to fill all pits or irregularities and coat said surface to a sufficient degree. This composition dries and forms a hard and durable coating of a smooth character, and the surfaces of a valve and valve seat so treated may thus be adapted to have a tight fit and effectually prevent leakage. The composition may obviously be used for other similar purposes.

In this composition the rubber cement and grease form a binder for the graphite, which gives a desired degree of solidity thereto, and the alcohol acts as a cutting agent for thinning out the cement so as to effect a thorough combination of the cement and grease together. The muriatic acid is employed as a cleansing agent for the purpose of cleaning the seat of the valve so that the composition will stick to it, and also as an additional cutting agent particularly for thinning out the grease, so that by the combined cutting action of the alcohol and the acid a thorough admixture of the ingredients will be effected. Water is used as a dilutent, particularly for the muriatic acid, but ordinary diluted muriatic acid may be employed and the water as a separate ingredient omitted. The cup grease employed is that commonly known by that name and employed for lubrication purposes, while the 600W grease is a thick black grease, commonly called differential grease, made by The Warren Refining & Chemical Co., of Cleveland, Ohio, and used ordinarily for lubricating automobile differential gears.

This grease is made of a mineral paraffin oil containing a proportion of graphite, the amount of graphite being dependent upon the degree of viscosity desired, to render it suitable for summer or winter use.

Having thus fully described my invention, I claim:

A surfacing composition of the character described comprising rubber cement, 5 ozs., cup grease, 6 ozs., differential grease, 4 ozs., graphite, ½ oz., denatured alcohol, ¼ oz., muriatic acid, ¼ oz., and distilled water, ½ oz.

In testimony whereof I affix my signature.

HUGH H. THEIS.